US009827529B2

(12) United States Patent
Rebouillat et al.

(10) Patent No.: US 9,827,529 B2
(45) Date of Patent: Nov. 28, 2017

(54) BREATHABLE PRODUCT FOR PROTECTIVE MASS TRANSPORTATION AND COLD CHAIN APPLICATIONS

(75) Inventors: Serge Rebouillat, Echenevex (FR); Malik Zeniti, Luxembourg (LU); Guy Hopp, Mondercange (LU); Sylvain Wallerich, Luxembourg (LU); Noel Stephen Brabbs, Garnich (LU); Sabine Gabriel, Harze (BE); Ioannis V Bletsos, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 251 days.

(21) Appl. No.: 14/238,891

(22) PCT Filed: Aug. 15, 2012

(86) PCT No.: PCT/US2012/050984
§ 371 (c)(1),
(2), (4) Date: Apr. 17, 2014

(87) PCT Pub. No.: WO2013/025827
PCT Pub. Date: Feb. 21, 2013

(65) Prior Publication Data
US 2015/0053086 A1 Feb. 26, 2015

Related U.S. Application Data

(60) Provisional application No. 61/523,502, filed on Aug. 15, 2011.

(51) Int. Cl.
*B01D 53/22* (2006.01)
*B32B 7/02* (2006.01)
(Continued)

(52) U.S. Cl.
CPC ........... *B01D 53/22* (2013.01); *B01D 53/228* (2013.01); *B01D 71/022* (2013.01); *B32B 3/12* (2013.01);
(Continued)

(58) Field of Classification Search
CPC .... B01D 53/22; B01D 53/228; B01D 71/022; B32B 3/12; B32B 5/022; B32B 5/08;
(Continued)

(56) References Cited

U.S. PATENT DOCUMENTS

| 2,018,990 | A | * | 10/1935 | Yost | F24F 6/04 122/20 A |
| 2,433,960 | A | * | 1/1948 | Sherman | F24F 1/02 165/230 |
| 2,880,182 | A | * | 3/1959 | Weissert | C08J 9/30 260/DIG. 24 |
| 2,924,635 | A | * | 2/1960 | Narbut | H01B 3/24 165/104.25 |

(Continued)

FOREIGN PATENT DOCUMENTS

| AU | WO 2011063472 A1 * | 6/2011 | ........... A43B 1/0045 |
| EP | 1400348 A2 | 3/2004 | |

(Continued)

OTHER PUBLICATIONS

PCT International Search Report and Written opinion for International Application No. PCT/US2012/050984Dated Oct. 24, 2012, 11 pgs.

*Primary Examiner* — Anthony Shumate

(57) ABSTRACT

The present invention concerns a breathable product for protective mass transportation and cold chain applications, in particular a reflective sheet for covering temperature sensitive products the reflective sheet having at least a first layer made of a highly reflective moisture vapor permeable substrate having an outer side and an inner side, wherein said inner side comprises in addition at least a metal layer deposited by a PVD process to provide a thermal insulation through high reflection low convection while providing controlled moisture vapor permeability.

10 Claims, 6 Drawing Sheets

(51) Int. Cl.
  *B32B 5/02* (2006.01)
  *B32B 5/08* (2006.01)
  *B32B 5/26* (2006.01)
  *B32B 7/12* (2006.01)
  *B32B 3/12* (2006.01)
  *B01D 71/02* (2006.01)

(52) U.S. Cl.
  CPC ............... *B32B 5/022* (2013.01); *B32B 5/08* (2013.01); *B32B 5/26* (2013.01); *B32B 7/02* (2013.01); *B32B 7/12* (2013.01); *B32B 2250/02* (2013.01); *B32B 2250/03* (2013.01); *B32B 2250/20* (2013.01); *B32B 2250/40* (2013.01); *B32B 2255/02* (2013.01); *B32B 2255/205* (2013.01); *B32B 2255/26* (2013.01); *B32B 2255/28* (2013.01); *B32B 2262/0253* (2013.01); *B32B 2262/0269* (2013.01); *B32B 2262/06* (2013.01); *B32B 2262/14* (2013.01); *B32B 2307/304* (2013.01); *B32B 2307/3065* (2013.01); *B32B 2307/416* (2013.01); *B32B 2307/724* (2013.01); *B32B 2439/70* (2013.01); *B32B 2439/80* (2013.01)

(58) Field of Classification Search
  CPC ......... B32B 5/26; B32B 7/02; B32B 2250/02; B32B 2250/03; B32B 2250/20; B32B 2250/40; B32B 2255/02; B32B 2255/205; B32B 2255/26; B32B 2255/28; B32B 2262/0253; B32B 2262/0269; B32B 2262/06; B32B 2262/14; B32B 2307/304; B32B 2307/3065; B32B 2307/416; B32B 2307/724; B32B 2439/70; B32B 2439/80; B32B 7/12; B32B 7/00
  See application file for complete search history.

(56) References Cited

U.S. PATENT DOCUMENTS

| | | | | |
|---|---|---|---|---|
| 3,081,519 | A * | 3/1963 | Blades | D01D 4/022 131/332 |
| 3,169,899 | A * | 2/1965 | Steuber | C04B 40/04 156/62.2 |
| 3,227,784 | A * | 1/1966 | Blades | B29C 67/00 264/205 |
| 3,386,181 | A * | 6/1968 | Steinacker | B01D 12/00 34/345 |
| 3,549,530 | A * | 12/1970 | Proffitt | D06M 7/00 252/8.81 |
| 3,851,023 | A * | 11/1974 | Brethauer | D04H 3/16 264/205 |
| 3,962,798 | A * | 6/1976 | Jackson | F26B 5/005 34/340 |
| 4,263,360 | A * | 4/1981 | Adelman | B32B 27/10 156/306.3 |
| 4,341,601 | A * | 7/1982 | Hartig | B01D 1/22 159/49 |
| 4,974,382 | A | 12/1990 | Avellanet | |
| 4,999,222 | A | 3/1991 | Jones et al. | |
| 5,316,837 | A | 5/1994 | Cohen | |
| 5,687,576 | A * | 11/1997 | Moriguchi | F25B 15/14 62/121 |
| 5,736,473 | A | 4/1998 | Cohen et al. | |
| 5,856,005 | A * | 1/1999 | Gurian | D02G 1/165 428/370 |
| 5,955,175 | A | 9/1999 | Culler | |
| 6,294,222 | B1 | 9/2001 | Cohen et al. | |
| 6,659,689 | B1 * | 12/2003 | Courtney | B63C 9/08 2/2.17 |
| 6,926,022 | B2 * | 8/2005 | Dornfeld | B01D 5/009 137/1 |
| 6,984,717 | B2 | 1/2006 | Van Den Bergen | |
| 9,101,679 | B2 * | 8/2015 | Robitaille | A61L 2/202 |
| 2003/0136078 | A1 | 7/2003 | Brown et al. | |
| 2003/0196789 | A1 * | 10/2003 | Wellington | B09C 1/02 166/64 |
| 2004/0071883 | A1 * | 4/2004 | Ogawa | B05C 1/0813 427/378 |
| 2005/0042959 | A1 | 2/2005 | Yeh et al. | |
| 2005/0159061 | A1 * | 7/2005 | Iwaki | D06M 11/45 442/181 |
| 2007/0016271 | A1 * | 1/2007 | Hammond | A61F 7/007 607/96 |
| 2009/0020448 | A1 | 1/2009 | Emond et al. | |
| 2009/0068907 | A1 * | 3/2009 | Sakagawa | C09K 21/00 442/142 |
| 2009/0079216 | A1 * | 3/2009 | Kuroda | B60R 13/0815 296/39.1 |
| 2010/0092739 | A1 * | 4/2010 | Kaasjager | C23C 18/1608 428/209 |
| 2010/0236492 | A1 * | 9/2010 | Calabrese | A01K 1/007 119/437 |
| 2010/0247855 | A1 | 9/2010 | Bletsos et al. | |
| 2011/0197987 | A1 * | 8/2011 | Koravos | F16L 59/026 138/149 |
| 2012/0058327 | A1 * | 3/2012 | Lopez | A61K 9/1274 428/312.8 |
| 2012/0141723 | A1 * | 6/2012 | Chuah | C07F 9/301 428/85 |
| 2012/0276332 | A1 * | 11/2012 | Conolly | C23C 14/562 428/138 |
| 2013/0122769 | A1 * | 5/2013 | Brabbs | E04F 13/077 442/286 |
| 2013/0167461 | A1 * | 7/2013 | Brabbs | B05D 3/046 52/309.1 |
| 2014/0283506 | A1 * | 9/2014 | Kuroki | F28D 15/025 60/320 |
| 2014/0315034 | A1 * | 10/2014 | Akiyama | A61F 13/15617 428/480 |

FOREIGN PATENT DOCUMENTS

| | | |
|---|---|---|
| JP | 2002345602 | 5/2001 |
| JP | 2004174997 | 6/2004 |
| WO | 0015860 A1 | 3/2000 |
| WO | 0121871 A1 | 3/2001 |
| WO | 0128770 A1 | 4/2001 |
| WO | 2005021824 A2 | 3/2005 |
| WO | 2006024013 A1 | 3/2006 |
| WO | 2007021783 A1 | 2/2007 |
| WO | 2008082292 A1 | 7/2008 |
| WO | 2009/039319 A1 | 3/2009 |
| WO | 2009/064706 A1 | 5/2009 |
| WO | 2010006664 A1 | 1/2010 |
| WO | 2010107989 A1 | 9/2010 |
| WO | 2011063472 A1 | 6/2011 |

* cited by examiner

BREATHABLE PRODUCT FOR PROTECTIVE MASS TRANSPORTATION AND COLD CHAIN APPLICATIONS

BACKGROUND OF THE INVENTION

1. Field of the Invention

The present invention concerns a breathable product for protecting articles in mass transportation and cold chain applications.

2. Description of the Related Art

Perishable and temperature-sensitive products such as vaccines or pharmaceutical diagnostics, or horticultural produce such as asparagus or roses deteriorate rapidly when the temperature exceeds certain values by even a few degrees and are, therefore, sensitive to poor temperature management experienced during transportation. Shipping methods for such product have weak points where the cargo is transferred from one means of transport to another, especially at airports where the cargo may be held on the runway while awaiting loading onto an aircraft. To minimize product and financial losses due to temperature excursions during transport, thermal covers may be used to protect a wide variety of cargo, such as flowers, fresh fruits and vegetables, fresh fish, pharmaceuticals and electronic products, from temperature fluctuations experienced during transport.

Many common packaging materials used to protect goods during transport, for example films, stretch films or shrink films, are usually impermeable to gases and water vapor so allow humidity to build up inside the package and condensation to form if the surface temperature changes, and also transmit light of wavelengths from infra-red to ultra-violet, allowing the temperature inside the package to rise rapidly due to a 'greenhouse effect' and for these reasons such packaging materials are not ideal for humidity or temperature-sensitive goods.

Many thermal covers comprise two or more layers which may be colored or transparent: a fibrous or foam insulation layer and a PVC. PE or PET outer layer which may or may not be reflective. Other protective materials comprise rigid insulation panels sandwiched between sheets of reflective aluminum or aluminium-coated film resulting in a relatively expensive system which requires additional labour to install and remove and which may only be economic as part of a reusable packing system, adding further to transport costs and supply chain complexity.

Usually multi-layer thermal covers protect pallets of perishable and pharmaceutical cargo during transportation by stabilizing the cargo temperature and shielding the cargo from weather including rain and sunlight damage. Those products help to meet cold chain requirements for specific temperature ranges for typically 2-48 hours, but such covers are not breathable so do not control condensation, and are not generally reflective to sunlight and so can suffer from the greenhouse effect which contributes to a rise in the temperature of the cargo. Such products are multiple-use durable products which are optimized for indoor use, and not for minimizing additional temperature rise due to direct sun exposure or for avoiding condensation. Additionally, they are relatively thick and heavy, making them time consuming to apply to and remove from the cargo and adding to shipping costs both in their contribution to the weight and bulk of the cargo and in the cost of returning them to their point of origin for re-use.

There is, therefore, a need for a lightweight, flexible and breathable cover material which can provide adequate thermal protection as well as protection from rain, at sufficiently low cost to allow single or one-way use during shipping of temperature sensitive goods. There is a further need, where logistics systems allow covers to be returned to the point of origin, for a lightweight, foldable cover which can reduce space and weight requirements on the return journey so providing a more cost effective multiple use cover for temperature sensitive goods.

US 2010/0247855 to Bletsos et al., the content of which is incorporated by reference in the present application, relates to breathable low-emissivity metalized sheets. According to this document, it is known in the art to use moisture vapor permeable (breathable) metalized sheets as house wrap in building construction. The metalized sheets allow moisture vapor to pass through the sheet, thus preventing moisture condensation in insulation that is installed behind the sheet, while at the same time providing a barrier to air and liquid water and enhancing the energy efficiency of the building. In such applications the material is embedded in a roof structure and is not exposed to direct illumination, so its reflectivity is irrelevant to its function, and can even be problematic while the structure is still open during installation as the glare of a very white surface can be disturbing to workers.

U.S. Pat. No. 4,999,222 to Jones at al. describes moisture vapor permeable metalized polyethylene sheets with low emissivity prepared by calendaring a plexifilamentary film-fibril sheet followed by vacuum metallization.

U.S. Pat. No. 4,974,382 to Avellanet describes an infiltration and energy barrier that can be vapor permeable or impermeable having at least one metalized layer thereon.

WO 01/28770 to Squires et al. describes breathable building membranes that include an under-layer of microporous film and a top layer formed of a filamentous polymeric fabric, for example a spunbond fabric, which is provided with a moisture vapor permeable reflective metal coating. While the breathable metalized sheets described above provide a thermal barrier by reflecting infrared radiation, they are susceptible to oxidation of the metal layer upon exposure to air and moisture. An oxidized metal layer generally has a higher emissivity than the corresponding metal and is less effective as a thermal barrier. Such breathable metalized sheets are also susceptible to corrosion of the metal layer upon exposure to acid rain or corrosive ambient conditions such as salt-laden air in coastal and marine environments. In addition, a thin exposed metal layer can be damaged during processing, installation, etc.

European Patent Application No. EP 1400348 to Avril et al. describes liquid impermeable, moisture vapor/gas permeable laminated fabrics that are suitable for use as construction fabrics such as house wrap and roofing underlay that include a reflective film layer formed by vapor depositing a metal layer on a first polymeric film layer and sandwiching the metal layer between the first polymeric film layer and a second polymeric film layer. The film layers protect the metal layer from damage during use, but are moisture impermeable and are microperforated after metallization to provide the desired moisture vapor permeability.

Metalized nonwovens that have been coated with an organic polymer are also known for construction end uses, such as house wrap. However, the polymeric coating is applied using methods that significantly reduce the moisture vapor permeability compared to the uncoated metalized nonwoven sheet.

U.S. Patent Application Publication No. 2003/0136078 to Brown et al. describes a method of insulating a building that includes the step of introducing an insulating membrane comprising a reflective layer and a breathable textile layer into the cavity between the outer cladding layer and the frame. The metalized layer may optionally be coated with a protective layer of plastic or varnish to protect the metal surface.

When a moisture vapor permeable sheet is coated over substantially an entire surface using conventional methods such as air knife coating, flexographic printing, gravure coating, etc., the coating significantly reduces the moisture vapor permeability of the sheet. If the starting sheet has an open structure and is highly air permeable, the sheet can retain sufficient moisture vapor permeability after coating to be useful in certain end uses, such as apparel. For example, fabrics described in U.S. Pat. No. 5,955,175 to Culler are both air permeable and moisture vapor permeable after being metalized and coated with an oleophobic coating. However, when the starting moisture vapor permeable sheet has a highly closed structure with very low air permeability, such as nonwoven and other sheets used as house wrap or roof lining in the construction industry, conventional coatings result in significant covering of the pores on the surface of the sheet. This results in a coated sheet having significantly lower moisture vapor permeability than the starting sheet. This is undesirable in house wrap and roof lining products, which are desirably permeable to moisture vapor while at the same time forming a barrier to infiltration by air and liquid water.

US 2009/0020448 to Emond et al, concerns a method and apparatus for wrapping shipment. Embodiments of the invention described therein relate to a cover, a method of covering, and a cover system to be used with shipments of products transported by air with unit load devices (ULDs). The dimensions of the cover system can vary depending on the ULD they are designed to be used with. The cover system can also be adapted to any individual skid such as wooden or plastic pallets used for smaller loads used in air transport or any other mode of transportation. The cover system can include one or multiple parts that wrap the shipment. Each part of the cover system can be made of one or more layers. Each layer can be made of a single material or a combination of different materials, and different layers can incorporate different materials. The different parts of the cover can be made of different materials or different combination of materials. In specific embodiments, materials used for the cover system are Radio Frequency Identification (RFID) friendly. The cover system provides thermal protection to temperature-sensitive products in or on the ULD. The cover system maintains the proper relative humidity level and gas concentrations (oxygen, carbon dioxide and ethylene) for horticultural product loads. The cover system can also have antimicrobial properties. In addition, the cover system decreases the amount of water vapor released in the cargo holds which is known to affect the reliability of the aircraft smoke detection system and to cause false fire alarms.

Further, in the prior art, a bubble film mostly made of polyethylene or polyester having at least one metallic reflective surface is applied to a cargo so that the metallic reflective surface is facing outwards away from the cargo, in order to reflect infrared components of radiation falling on the cargo from the exterior, and so reduce heating of the cargo.

Other prior art publications include for example WO 2010/006664, US 2010/0092739, US 200510042959, WO 01/21871, WO 20051021824, WO 00/15860, U.S. Pat. No. 5,736,473, U.S. Pat. No. 6,294,222, U.S. Pat. No. 5,316,837, JP 2001 115252 A, JP 04093243, JP 2002 345602 A, JP 2001 317889 A, JP 08049165, WO 2010/107989, WO 2007/021783, WO 20061024013.

In WO 2006/024013 the content of which is incorporated by reference in the present application, the objective of the described invention is to achieve high moisture vapor permeability (at least 80%) of the initial sheet while achieving a barrier to air and liquid water infiltration and good thermal barrier. That product is suitable for use as a building construction wrap such as roof lining and house wrap.

SUMMARY OF THE INVENTION

The present invention relates to a reflective sheet for covering products, such as perishable products or electrical or electronic devices, comprising at least a first layer made of a highly reflective moisture vapor permeable substrate having an outer side and an inner side as seen from the protected product, wherein the said inner side comprises in addition at least a metal layer, preferably deposited by a physical vapor deposition (PVD) process to provide improved thermal insulation through high reflection on the outer side, low emissivity on the inner side and providing a barrier to convective heat transfer but allowing controlled vapor permeability through the reflective sheet.

The present invention further relates to a fire retardant sheet for covering products, wherein said sheet comprises at least a first layer made of a high reflective moisture vapor permeable substrate having an outer side and an inner side, wherein said inner side comprises in addition at least a metal layer deposited by a PVD process and said inner side or said outer side or both further comprises a fire retardant layer.

The present invention further relates to a fire retardant sheet for covering products, wherein the said sheet comprises at least a layer of a flame retardant fiber mix with an outer side and an inner side, and at least a metal layer deposited by a PVD process on the inner side.

DETAILED DESCRIPTION OF THE INVENTION

The present invention will now be described in more detail by reference to embodiments thereof.

In the present description, the expression "inner side" of the sheet or cover or highly reflective moisture permeable substrate means the side of the sheet or cover or highly reflective moisture permeable substrate that faces towards the product or device being protected by said sheet or cover, the "outer side" of the sheet or cover or highly reflective moisture permeable substrate thus being the side facing towards the exterior, for example, which will be directly exposed to a heat source such as radiation from the sun, artificial lighting and other heat generating environment. Similarly the term, "inner layer" is to be interpreted as a layer of a highly reflective, moisture permeable substrate or composite, reflective, moisture permeable cover which faces towards the product or device being protected and an "outer layer" as a layer facing towards the exterior, for example, which will be directly exposed to radiation from the sun, light and other exterior environment.

Figure 1A:
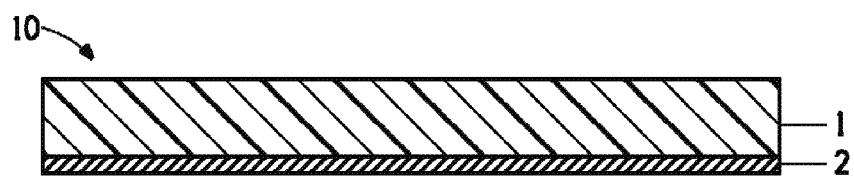
FIGS. 1a and 1b illustrate two embodiments of the invention.
Figure 1B:
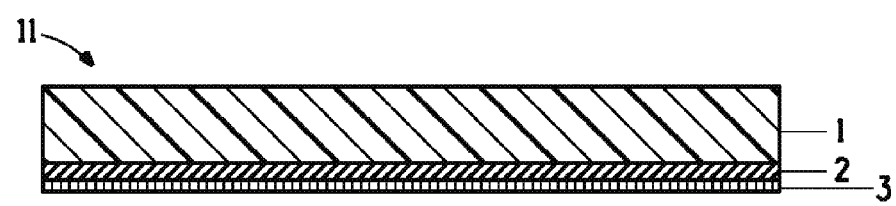

In FIGS. 1a and 1b, embodiments 10 and 11, respectively, of a reflective sheet according to the present invention are illustrated. In FIG. 1a, a low emissivity breathable cover 10 is illustrated with a low emissivity coating facing inside. The reflective sheet comprises at least a layer 1 of a first material providing a high reflection side on the outer side and a low emissivity metal layer 2 on the inner side. Typically, the reflective sheet of layer 1 is made of a Tyvek® having an areal density of 40-90 g/m². The metal layer 2 can be typically aluminium. In FIG. 1b, a low emissivity breathable cover 11 with layer 1 and coating 2, comprises in addition a protective lacquer coating 3, which can be a crosslinked polyacrylate providing corrosion resistance and mechanical protection.

Figure 2A:
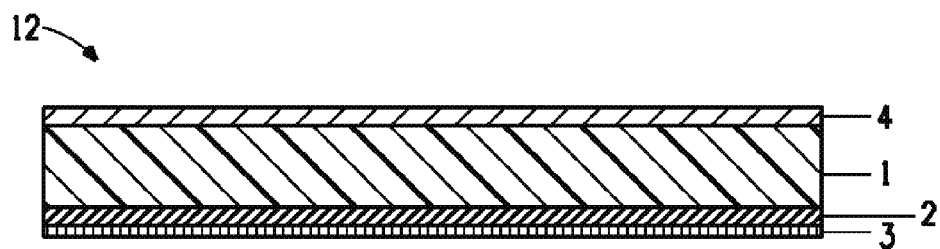
FIGS. 2a-2c illustrate three further embodiments of the invention.
Figure 2B:
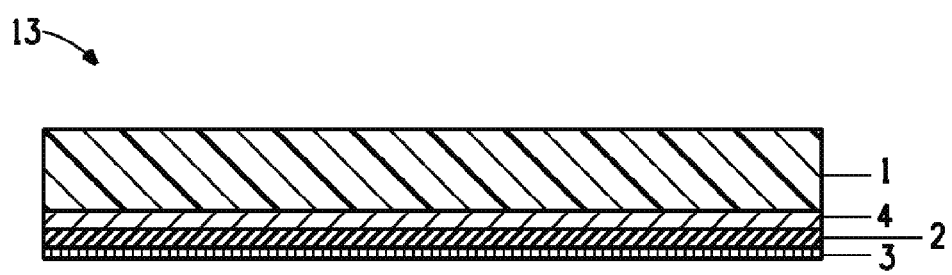
Figure 2C:
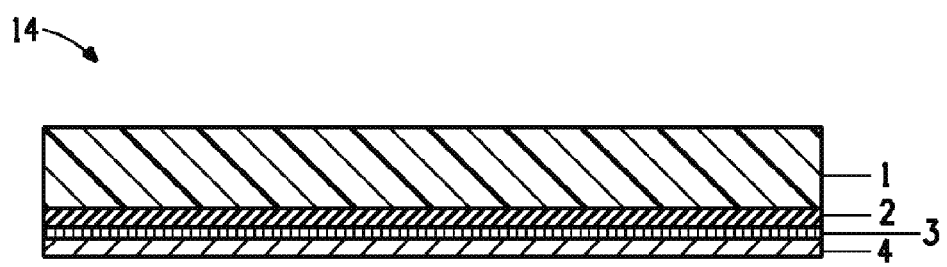

In FIGS. 2a-2c, further embodiments 12-14 are illustrated of a low emissivity fire retardant cover, for example a cargo cover. The layers included in this cover are. layer 1, coatings 2 and 3 and in addition a flame retardant coating 4 which may be adjacent to the high reflectivity side of the reflective sheet as FIG. 2a, or adjacent to the low emissivity side of the reflective sheet with a protective lacquer as shown in FIG. 2c or may be situated between the porous substrate 1 and the metallic low emissivity layer 2 as shown in FIG. 2b.

Figure 3A:
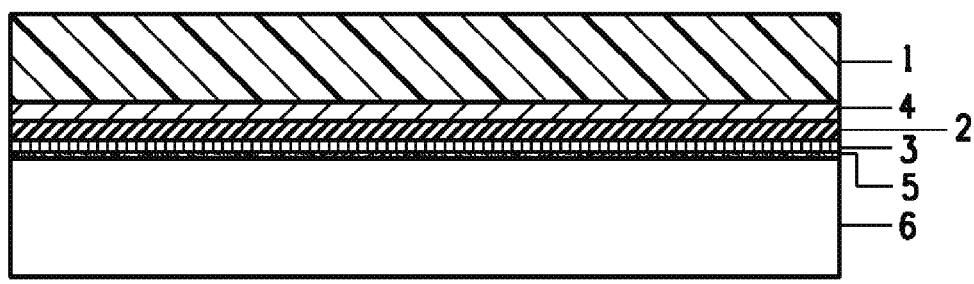
FIGS. 3a and 3b illustrate two further embodiments of the invention.
Figure 3B:
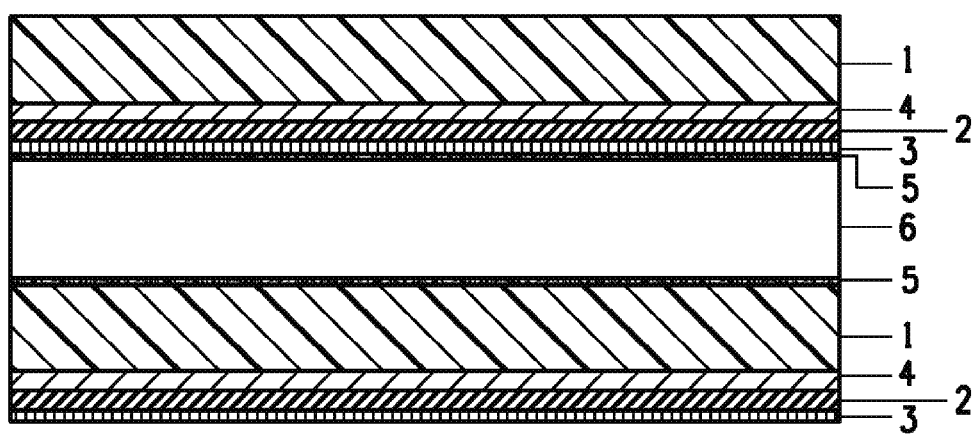

FIGS. 3a and 3b illustrate embodiments 15 and 16 forming a low emissivity fire retardant high performance insulation cargo cover. FIG. 3a shows a reflective, flame retardant sheet and additionally comprises adjacent to the low emissivity side of the reflective sheet an optional adhesive layer or adhesion promotion layer 5 and an insulative spacer layer 6 which provides an additional insulation capability to the cover. FIG. 3b illustrates a further embodiment 16 wherein two layers of a reflective sheet material are separated by a spacer layer 6 and optional adhesive or adhesion promoting layers 5 as described above. In embodiments employing an adhesive or adhesion promoting layer(s) 5, the resulting high performance flame retardant cover may be provided as a pre-fabricated laminated structure ready to apply to the product or cargo to be protected. In embodiments where the adhesive or adhesion promoting layer(s) 5 are omitted, the resulting high performance flame retardant cover may be provided as a cover system of multiple layers which may be applied successively to the product to be protected.

Figure 4:
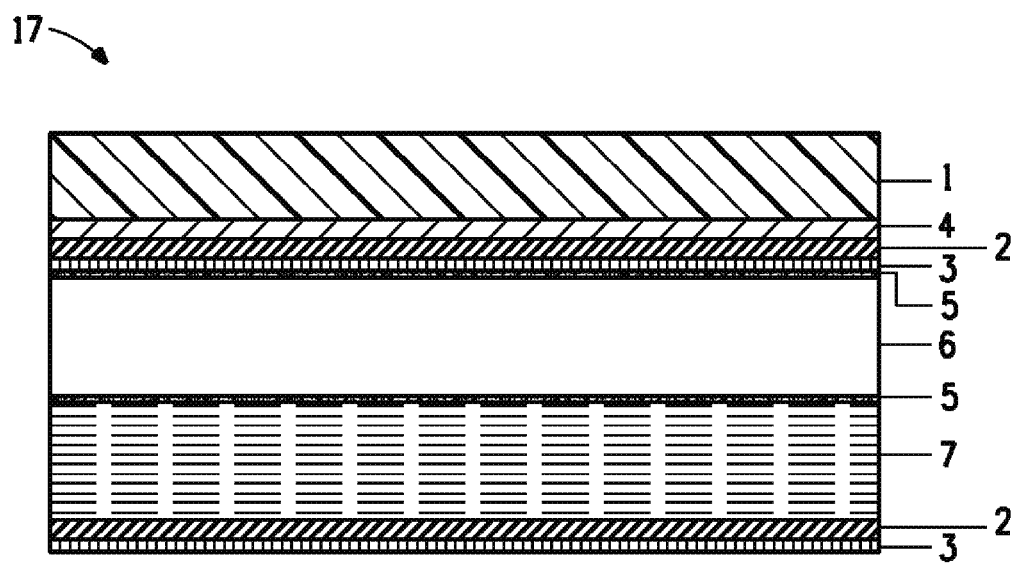
FIG. 4 illustrates another embodiment of the invention.

FIG. 4 illustrates another embodiment 17 being a low emissivity, fire retardant, high performance insulation multi-layer cargo cover incorporating fire blanket which can be used on the outer side or on the inner side. On the high reflection side, this cover comprises the successive layers 1-6 as described in FIG. 3a above. In addition, this cover comprises on the flame retardant side a layer 7 of aramid (such as Nomex®) or a flame retardant fiber mix with aramid and natural fibers and deposited thereon, a metallic low emissivity coating 2 and a protective lacquer 3.

Figure 5A:
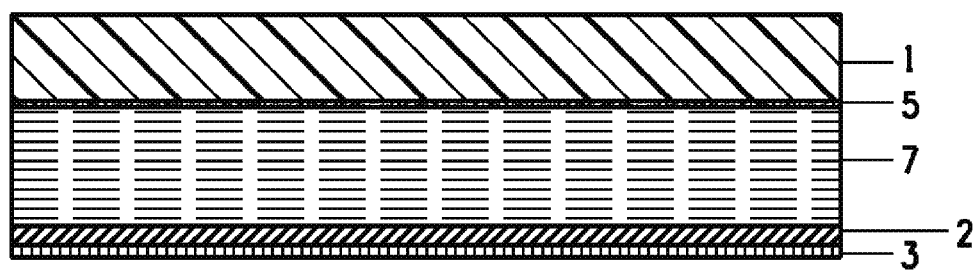
FIGS. 5a and 5b illustrate two further embodiments of the invention
Figure 5B:
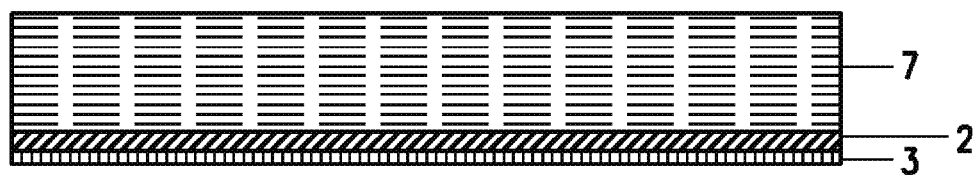

FIGS. 5a and 5b illustrate simpler embodiments of the invention. FIG. 5a represents a low emissivity breathable fire retardant cover 18 with low emissivity metal layer. More specifically it comprises 1 to provide a highly reflective outer layer 1, laminated optionally by an adhesive or adhesion promoting layer 5 to a fire resistant layer 7 having deposited thereon, a metallic low emissivity coating 2 and a protective lacquer 3. Where the fire resistant layer is itself sufficiently reflective to achieve the effect desired from a breathable reflective sheet, it may be used with a metallic low emissivity coating 2 and a protective lacquer 3 as illustrated in FIG. 5b.

Figure 6:
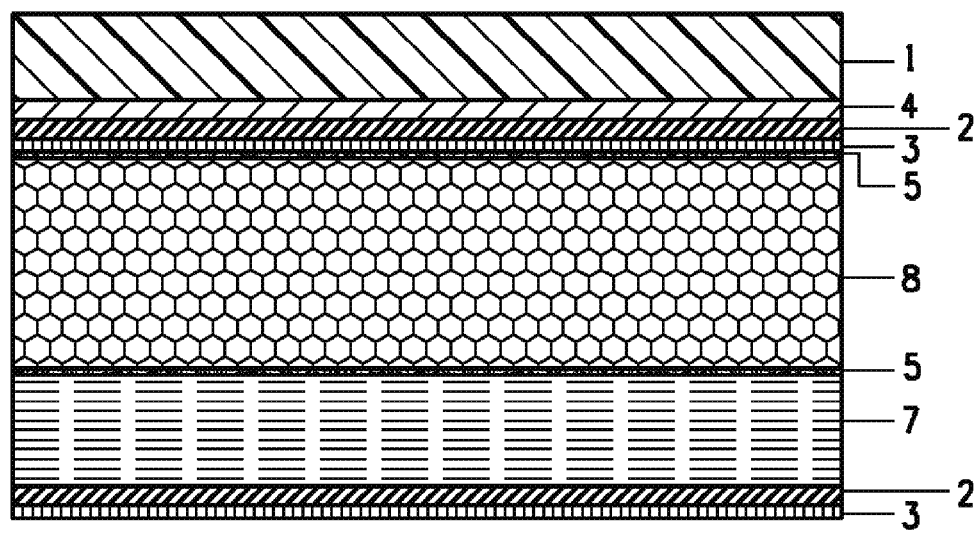
FIG. 6 illustrates another embodiment of the invention.

FIG. 6 illustrates a further example of the invention with a low emissivity breathable fire retardant rigid cover 20 with low emissivity coating inside and lightweight structural strength. This embodiment thus comprises a reflective, flame retardant sheet as illustrated in FIG. 2 and adhered to the metalized side of this sheet it further comprises a semi-rigid layer 8. For improved structural strength, a further layer 7 of fire resistant aramid is adhered by an adhesive or adhesion promoting layer 5 on the inner surface of the honeycomb or similar non-woven structure, this layer having deposited on its inner surface a low emissivity metal layer 2 and a protective lacquer 3. The honeycomb structural element provides some additional thermal insulation because the spaces inside are filled with air, but these spaces may also be filled with a phase change material such as a wax, which will absorb and liberate additional heat during melting and freezing when the temperature distribution within the layers is favorable and the presence of the phase change material is not detrimental to the protected goods.

Another example according to the invention includes an active cooling layer (ACL). This active cooling layer preferably comprises a sealed enclosure containing a wicking sorbent imbibed with a liquid coolant in which the phase changes take place (liquid-vapor, vapor-liquid). The ACL comprises a condensation part (CP) and an evaporation part (EP). The condensation part is in contact with a metalized or reflective surface of an outer reflective layer (for example layer 2 made of a PVD aluminum coating as illustrated in FIG. 1). The evaporation part surface is in contact with the heat generation devices or heat/radiation source.

In a further embodiment, the reflective sheet comprises a sealed layer containing a coolant, such as a phase change material or liquid coolant, an evaporation part (EP) and a condensation part (CP), such that the coolant liquid flows to the evaporation part to evaporate toward the condensation part to then condense, thus dissipating heat. In yet a further embodiment the condensation part is in contact with the metal layer.

The present invention also relates to a composite sheet comprising a reflective sheet as defined above and a fire retardant sheet as defined above.

The present invention also relates to a cover or covers for products, in particular temperature sensitive products, wherein said cover comprises at least a reflective sheet as defined above, or a fire retardant sheet as defined above, or a composite sheet, alone or in combination, wherein the side(s) of the reflective sheet(s) bearing a low emissivity metal layer is/are directed towards the product to be covered, i.e. the temperature sensitive product.

The present invention also relates to the use of a reflective sheet as defined above, the use of a fire retardant sheet as defined above and the use of composite sheets as defined above or of a cover as defined above, alone or in combination, to form a cover for products, in particular temperature sensitive products such as perishable goods or transportable electrical and electronic devices, e.g. used by mobile civilian and military resources, and other equivalent devices, wherein the side of the reflective sheet having the low emissivity metal layer is directed towards the product to be covered, i.e. the temperature sensitive product.

An aim of the present invention is also to improve the thermal insulation properties of a cover or sheet through a combination of layers preferably having a low air permeability of at least 15 seconds as measured by Gurley Hill Air Porosity (lower values indicate higher permeability), preferably greater than 30 seconds and more preferably greater than 50 seconds. If the air permeability is too high, convective heat transfer through the reflective sheet will increase and compromise its thermal barrier properties. A further aim of the present invention is to improve the thermal insulation properties of a cover or sheet through a combination of layers preferably having a low intrinsic thermal conductivity, as is the case, for example, with polyethylene or polypropylene non-woven or woven sheets, being further enhanced by the fibrous structure of the sheet which incorporates microscopic air pockets within the structure to further reduce the bulk thermal conductivity of the sheet and minimize thermal conduction through the sheet. A further aim of the present invention is to improve the thermal insulation properties of a cover or sheet through a combination of layers preferably having on its inner surface a layer having low emissivity of less than 0.35, preferably less than 0.25, and more preferably less than 0.15 so as to reduce radiant heat transfer from the sheet to the protected product or cargo. A further aim of the present invention is to improve the thermal insulation properties of a cover or sheet through a combination of layers preferably having on the outer side a high total light reflectivity of greater than 65%, preferably greater than 80% and more preferably greater than 90% of visible light so as to reduce heating of the reflective sheet by absorption of incident light.

An objective of the present invention is to use a selected combination of materials and process steps to provide a reflective sheet having a specified external reflectivity, a specified low internal emissivity, and controlled gas permeability, especially water vapor permeability, while maintaining low thermal conductivity, low air porosity and high barrier to the ingress of liquid water. Metalized nonwoven fabrics, preferably polyethylene nonwoven fabrics such as flash spun Tyvek®, or other equivalent micro-porous substrates, have been found to perform well as a controlled barrier cover to reduce convective heat transfer, to reflect incident solar radiation, to slow down radiant heat transfer and to maintain acceptable permeability, especially in hot climates. In particular, the reflectivity and water vapor permeability of polyethylene nonwoven fabrics such as Tyvek® may be further improved by controlling the porosity and fiber size distribution.

The combination of the controlled air and water vapour permeability, high reflectivity and low emissivity of the cover material of this invention with a heat absorption layer which can further reduce temperature rise by absorbing heat in a change of phase (latent heat), thus providing increased thermal inertia, is also incorporated in this invention.

The reflective sheet or cover having the low emissivity metal layer, in particular the highly reflective moisture vapor permeable substrate can be any self-supporting sheet or cover such as porous or non-porous sheets or covers, preferably flexible sheets or covers, for example any fabric known in the fabric art, such as nonwoven, woven, knitted fabrics, membranes, microporous films, grids or a combination of two or more sheets or covers such as for example SMS (spunbonded-meltblown-spunbonded) laminates. Preferably the reflective sheet or cover, in particular the highly reflective moisture vapor permeable substrate, is a nonwoven or woven fabric comprising one or more natural or synthetic (man-made) fibres or filaments. The natural fibers or filaments of the nonwoven or woven fabric can be chosen among cellulose, cotton, wool, silk, sisal, linen, flax, jute, kenaf, hemp, coconut, wheat, and rice and/or mixtures thereof. The synthetic (man-made) fibers or filaments of the non-woven or woven fabric can be chosen among polyamides, polyaramides, polyesters, polyimides, polyolefins, polyacrylates, poly(tetrafluoroethylene) and copolymers comprising tetrafluorethylene, other fluorinated copolymers and/or hybrids and mixtures thereof.

The sheet or cover of the invention is preferably a nonwoven fabric, more specifically a flash-spun nonwoven fabric. An example of those fabrics is a polyethylene flash-spun fabric as commercially available, for example, under the tradename Tyvek® from E.I. du Pont de Nemours & Company.

The highly reflective moisture vapor permeable substrate is provided on its inner side with a low emissivity metal layer which may be conveniently deposited by a physical vapor deposition (PVD) process such as those described in the Handbook of Physical Vapor Deposition Processing (Mattox, Noyes Publication, 1998). In such processes, the metal is heated (by inductive heating, electron beam radiation or by contact with a resistively heated surface) in a vacuum so that a pool of liquid metal is created at its boiling point at the low pressure inside a vacuum chamber. A cloud of metal vapor forms above the liquid metal and the substrate to be coated is passed through this cloud so that vapor condenses on the cold surface of the substrate to form a thin layer of solid metal. Other means of depositing the metal layer may also be employed, such as sputtering or chemical vapor deposition (both of which are also carried out in vacuum), or electrochemical or chemical deposition of a metal layer from a suitable solution.

Prior to applying the metal layer, the surface of the substrate may be cleaned and/or prepared for metal deposition by corona treatment, flame treatment, atmospheric or vacuum plasma treatment, plasma etching or other suitable techniques. Appropriate plasma processes are such as those described in the Handbook of Advanced Plasma Processing Techniques (Shul & Pearton, Springer, 2000). Primer layers to improve the adhesion and quality of metal layers deposited on the substrate may be provided by such "Chemical Vapor Deposition (CVD)" methods as are described in Vacuum Deposition onto Webs, Films, and Foils (Bishop, William Andrew Publishing, 2007) or by other conventional or plasma assisted coating techniques. For example, a process known as "atmospheric pressure plasma liquid deposition (APPLD)" may be found as suitable in the surface treatment of the various layers of the assembly of the present invention. Of course, other processes may also be suitable for the present invention.

The physical vapor deposition of a metal onto the reflective surface provides a metal layer on the surface of each fiber at the surface, thus maintaining the breathability of the substrate while providing an inner surface with an emissivity of less than 0.25, preferably less than 0.15 and most preferably less than 0.1. Any metal providing a chemically stable surface having suitably low emissivity surface may be used, such as gold, platinum, nickel, chromium, tin, zinc, silver, or aluminum or alloys thereof. The preferred metal is aluminium. When the metal used is aluminum the thickness of the low emissivity metal layer may conveniently be less than 0.3 microns, more preferably less than 0.2 microns and most preferably less than 0.1 microns.

The low emissivity metal layer of the reflective sheet of the present invention may be used alone, but in this case it may be susceptible to mechanical damage or abrasion during handling, or to corrosion on extended exposure to air, moisture vapor and water. In this case, it is preferable to apply on top of the low emissivity metal layer a protective lacquer. The thickness and composition of this protective lacquer is selected such that it substantially changes neither the moisture vapor permeability of the reflective sheet, nor the emissivity of the low emissivity metal layer to which it is applied. The protective lacquer preferably has a thickness between 0.2 and 2.5 microns, more preferably between 0.2 and 1.0 micron. The composition of the protective lacquer may be freely chosen among hydrophobic materials which will effectively protect the metal surface from attack by moisture and oxygen, provided they can be applied in a suitably thin layer as described above. Cross-linked polyacrylates and vinyl polymers have been found to be especially convenient as these can be applied in the form of low viscosity monomeric or oligomeric precursors and polymerized in situ by well-known thermal or radiation curing methods.

The reflective sheet and the fire retardant sheet of the present invention can comprise a fire retardant layer. The fire retardant layer comprises at least one flame retardant composition which is applied in sufficient quantity to inhibit combustion without compromising the flexibility OF moisture vapor permeability of the reflective sheet or adding excessive cost. The flame retardant composition can conveniently be applied to the reflective sheet at a rate of not more than 50 g/m$^2$, preferably from 1 to 25 g/m$^2$, and more preferably from 2 to 15 g/m$^2$ depending on the areal weight and inherent flammability of the reflective sheet.

The at least one flame retardant composition may fully or partially cover the surface to which it is applied and in the latter case may be present in the form of various patterns. The flame retardant composition may be chosen among any effective flame retardant compositions known in the art, such as for example, phosphorus based compositions, halogenated flame retardant compositions, filler compositions, metal hydrate compositions, boron based compositions, inorganic salt compositions, organometallic salt compositions, fluoropolymer compositions, silicone based compositions, melamine based compositions as described by A & Innes in chapter 27 of the Applied Plastics Engineering Handbook, Myer Kutz (editor), William Andrew Publishing, 2011. and/or combinations thereof. Phosphorus based compositions may be chosen among compositions comprising phosphates, polyphosphates, phosphate esters, phosphites, phosphonates or phosphonate esters, phosphinates, phosphine oxides, phosphonitriles, phosphonic acid amides, phosphazines and/or combinations thereof. Radiation curable phosphorus containing oligomers such as are disclosed in EP 1370603 are especially suitable.

Insulative spacer layers which may be used in combination with the reflective sheet of the present invention may be made from different materials, for example, multifilament fiber fill, natural fiber or 3D filament structure, polymer foam, a bubble wrap as equivalent examples, or combinations thereof. Material having a cost-efficient low thermal conductivity like glass or mineral fibers or polymeric open- or closed-cell foams or aerogels may be used for this layer. High performance polymers and fibers which can be used to form all or part of the insulative spacer layer are polyaramids, polyaramids having ballistic performance, gel spun and solid state high performance polyethylene, melt spun aromatic polyester, PE, PET, PTT, PEET, PBO, PPD or M5®, Armos® aromatic copolymers, carbon glass and ceramic fibers, chlorinated fibers, PVDC, fluorinated fibers, FIFE, PVF, PVDF, FEP, PEEK, PPS, PEI, thermosets, semi-carbon fibers, oxidized acrylics, PBI, PBO. Depending on the application, preference will be given to temperature resistant materials.

Furthermore, closed-cell foams derived from polystyrene and polyurethane may also be used to form an insulative spacer layer but these are highly flammable and may be more suitable with the addition of flame retardants. Foams derived from polyisocyanates exhibit better flame resistance than polystyrene and polyurethane, and phenolic foams exhibit even better flame resistance than polyisocyanurate foams. Those foams do not need to be based on monomers which are produced from a petroleum feedstock, a non-renewable resource, but may be derived from renewable sources such as vegetable oil and preferably high oleic acid oils or natural or synthetic tannins. Preferably, low thermal conductivity and fire resistant polymeric foams are most suitable depending on the applications.

Depending on the structure and composition of the insulating spacer layer, the intrinsic permeability of the said insulating spacer layer to gases and especially to moisture vapor may be relatively low. This may be especially true in the case of closed cell foams, PCMB and materials designed to imbibe water or other liquids to provide thermal inertia. In such cases, any adverse impact on the overall moisture vapor permeability of high performance composite reflective sheets comprising such insulating spacer layers may be overcome by perforating the insulating spacer layer or by otherwise constructing the insulating spacer layer in a patterned structure of strips, patches or a net-like arrangement, so as to leave sufficient spaces between adjacent areas of insulating spacer material to permit the passage of gases, especially moisture vapor, through the high performance composite reflective sheet.

A layer of Tyvek® having controlled permeability that can be adjusted as mentioned above combined with heat reflective and absorption material that can take up a quantity of heat by evaporation or change of phase is incorporated in this invention. Indeed a further practical embodiment of the present invention is that a heat sink may be included in the product, for example phase change materials (PCM) such as ice, water or solid carbon dioxide and where evaporation or sublimation takes place, the vapor produced is still able to exit the package through the pores in the substrate to carry heat away, and the rate of evaporation may be controlled by the porosity of the substrate layers. This increased thermal inertia through use of a PCM and evaporation greatly extends the potential field of applications of this invention to cool shelters for post-harvest protection, cold bags and containers for use in areas with high sun exposure where refrigeration may not be available.

Where water is the PCM, water filling may be carried out just before deployment by directly filling water into a pouch formed by sealing the edges of the layers of reflective sheet material used to form the cover, shelter or container. Alternatively, if the internal space is filled with a porous material, the capillary effect may be used to draw water or other PCM's into the liner. A typical polyester needle punch nonwoven batting can provide this functionality with water. Additional resistance due to the controlled permeability of the reflective sheet materials slows down evaporation to obtain 2-48 hours of cooling effect, while still limiting the radiant heat absorption due to the high reflectivity of the reflective sheet, and reducing radiant heat transfer to the cargo by the low emissivity internal surface.

Adding a heat sink and a fire retardant to this invention expands its use beyond air cargo covers into other protective applications such as fire blankets, hail damage resistant or ballistic covers, etc.

The composite multilayer product according to the invention can be made from a combination of thin 0.05-1 mm multi-layer materials providing high reflectivity, low emissivity, corrosion protection, flame retardancy, heat sink or phase change properties. These may be combined with layers which further improve thermal properties and provide some cushioning against impacts, such layers may be stiff voluminous layers of 1 to 25 mm thickness such as foams, honeycomb structures, three dimensional mono-filament structures which create an air gap, or heat sink or phase change materials. Heat sink or phase change materials may be, for example, water, ice, solid carbon dioxide or waxes providing thermal inertia.

The reflective sheet of the present invention can further comprise on its inner side a controlled moisture vapor permeable insulating space layer.

The insulating space layer may also be used actively as an active cooling layer (ACL). More specifically, in order for the multilayered temperature management assembly of the invention to perform heat dissipation by reflection of external heat sources and at the same time to eliminate the heat generated by the covered article, such as but not limited to transportable electrical and electronic devices used by mobile civilian and military resources in warm environment, the insulating space layer can be modified to perform a reversibly active cooling effect based on the following principle, here described as an illustration only and not to be construed in a limiting manner. The reversibility active cooling effect is fully applicable to other cargo coverings as illustrated before. The PCM associated effect, described before, is also taking place inside the ACL units.

A liquid coolant is encased, under vacuum if necessary depending on its boiling/evaporation temperature, in a sealed layer itself part of the multilayered temperature management assembly/cover of the invention. The liquid coolant circulates between an evaporation part (EP), in contact with the heat generating devices, and a condensation part (CR) which can be the metalized part of the reflective layer as described herein, which surface area may be further engineered to maximize contact. Therefore, the liquid phase coolant continuously flows to the evaporation part EP by means of capillary forces generated between it a wicking material, preferably micro fibrous, nano or micron sized, placed in between the EP and CP surfaces and maintained at a suitable distance depending on the desired heat management. Entering into the vapor phase at the evaporation part EP, the now gaseous coolant flows toward the condensation part CP, and condenses there.

This process is reversible and continues as long as suitable gradients of temperature are present. The reflective layer of the multilayered temperature management assembly of the invention contributes synergistically to the overall performance of the system in managing internal and external heat fluxes to maintain the most suitable operating temperature to ensure durability of the equipment or heat management of the perishable goods contained in the cargo.

The liquid layer can be a low boiling point liquid such as but not limited to: hydrocarbons, halogenated solvents, water, surfactants, aerosols, molten metals and salts, liquid gases, nanofluids and combinations thereof. The liquid coolant has preferably a boiling point between −60° C. and 300° C. The surface tension of the liquid will be selected or modified to best suit the wettability of the wicking material.

The wicking sorbent may include fibers such as natural fibers, synthetic fibers or carbon fibers or ceramic nanotubes. The longer axis of the fiber structure will preferably be oriented in the direction of the flow of fluid. Suitable fiber coatings to enhance the wicking effect can be used. Fiber surface grooves may provide surface enhancement and are also beneficial to the flow. Granular wicking agents can be used alone or in combination with the above. The wicking sorbent may include pulp, paper, fabric or nonwoven fabric.

A breathable reflective cover of this invention may also be useful when a product, cargo or device requires temporary protection from low temperatures which may be experienced in a cold environment. In this case, when the exterior temperature is lower than that of the cargo and depending on the conditions of solar radiation exposure expected, it may be advantageous to use the breathable reflective sheet with the low emissivity metallic layer facing outwards or to use a breathable reflective sheet having low emissivity metallic layers on both sides, or to use a composite breathable reflective sheet, with or without a spacer layer, with multiple metallic layers facing inside and outside as required.

The examples and values given above in the description of the invention are only for illustrative purposes and should not be construed in a limiting manner, Different embodiments of the invention may be combined together. For example, different layers and/or embodiments as described herein may be combined together to form a product (i.e. sheet of cover) that is adapted to the product being covered (respiration, gas production, energy production, heat etc.) and to the expected use conditions.

EXAMPLES

Light reflectivity was measured according to ISO 771411 using a Minolta CM-3600d spectrophotometer over the wavelength range 400-700 nm. Moisture vapor transmission rate (MVTR) was measured according to EN ISO 12572-C. Liquid water penetration was measured as hydrostatic head according to EN 20811. Emissivity was measured according to ASTM C1371. Flammability was tested according to method ISO 3795 for horizontal burning.

Measurements of Radiant Heat Transfer Across Reflective Sheet Materials

A device was constructed to compare reflective sheet materials by irradiating specimens with visible and infra-red radiation from one side, and by monitoring the temperature rise on the other side of the reflective sheet over time. The apparatus consisted of two chambers of identical size and shape, 21 cm wide×30 long×33 cm high, constructed from suitable heat resistant and insulating materials and having a horizontal floor and vertical walls, each chamber having a light fitting mounted in its roof which was equipped with a Philips IR 150 RH 150 W infra-red spot-lamp so that the distance from the bottom of the lamp to the floor of the chamber was 25 cm. In the floor of each chamber was a small depression 3 cm wide×10 cm long×2 cm deep, centrally located directly below the spot-lamp and containing a PT100 temperature sensor. An ISO A4 sized specimen of a reflective sheet could completely cover the floor of either chamber so as to block any direct illumination of the temperature sensor by the lamp, the distance between the temperature sensor and the lower surface of the specimen always being 2 cm and direct contact between the specimen and the temperature sensor being prevented by the sides of the sensor well.

In a typical experiment, with the apparatus and test specimens initially at room temperature, A4 specimens of materials to be tested were placed on the floor of each of the chambers of the apparatus so as to completely cover the thermal sensor wells. The specimens could be of the same material if two measurements of the same material were to be carried out at the same time, or could be specimens of different materials if two materials were to be compared. The lamps were then switched on and the starting temperatures $T_0$ recorded by the thermal sensors beneath each specimen were recorded. The temperatures $T_t$ were then recorded at fixed times t during a period of about 15 minutes or until the temperature exceeded 60° C. Specimens having poor thermal barrier performance showed a rapid rise in the temperature recorded by the sensor, while those having better performance showed a relatively slow rise in temperature. This performance was quantified for each sample by first subtracting the initial temperature $T_0$ from each temperature reading at subsequent times $T_t$ to give the temperature rise at each time $\Delta T_1$ To compensate for any systematic differences between the radiant output of individual lamps, a complete experiment required two tests runs to be carried out consecutively with the same pair of specimens but with their positions in the two test chambers exchanged in the second run. For each time t, the two $\Delta T_t$ values from the two test runs were averaged. It was found that the $\Delta T_t$ values at 5 minutes ($\Delta T_5$) and 15 minutes ($\Delta T_{15}$) provided convenient and reproducible measures of thermal protection, with lower values indicating better thermal protection.

Comparative Example 1

A test was carried out using the apparatus described above with no reflective sheet specimens in place so that the radiation from the infra-red lamp impinged directly on the temperature sensor.

Comparative Example 2

A package was placed on a pallet and the assembly was wrapped with four layers of Resinex 581, a 23 micron polyethylene stretch film such as is commonly used to pack goods for shipment and to stabilize pallet loads, available from AFP Holland, applying sufficient tension to ensure the package was secured to the pallet. An approximately ISO A4 sized sample of all four layers of the stretch film was carefully cut from the package using scissors, ensuring the layers remained adhered together, and this stack of layers was then tested by the method described above. Due to the transparent nature of this material, emissivity and reflectivity were not reliably measurable.

Comparative Example 3

Isohood (Ventiflex) insulation film, a metalized bubble wrap such as is commonly used to pack temperature sensitive goods for shipment, available from EcoCool GmbH, having an areal density of 180 g/m², a total thickness of approximately 3 mm and an emissivity measured on the metalized side of 0.35, being composed of a metalized polyethylene film layer, a transparent polyethylene film layer and sandwiched between them a layer of closely spaced, circular, sealed, 10 mm diameter air pockets enclosed by polyethylene film, was tested by the method described above with the metalized side facing up towards the infra-red lamps i.e. outwards towards the heat source, this being the orientation in which such metalized packing materials are installed to protect temperature sensitive cargo during transport. Due to the transparent outer surface and non-uniform appearance of this material on its plain side, its reflectivity was not reliably measurable.

Comparative Example 4

The metalized bubble wrap of Comparative Example 3 was tested by the method described above with the metalized side facing down towards the temperature sensor, i.e. in the opposite orientation to that in which such metalized packing materials are installed to protect temperature sensitive cargo during transport.

Comparative Example 5

Tyvek® 1560B, a white, polyethylene non-woven sheet having an areal density of 58 g/m², a total light reflection of 90.3% and an emissivity of 0.62, available from E.I. DuPont de Nemours and Company, was tested by the method described above.

Comparative Example 6

ISO A4 sheet samples were prepared from a metalized polyethylene non-woven reflective sheet having and areal density of 60 g/m² and bearing on one side a thin layer of metallic aluminium covered by a thin corrosion resistant coating, commercially available from E.I. DuPont de Nemours and Company as Tyvek® 3563M, and having a total light reflection measured on the white side of 90.7% and an emissivity measured on the metalized side of 0.15. This material was tested by the method described above with the metalized surface facing up towards the infra-red lamps.

Example 7

The sheet samples of Comparative Example 6 were tested by the method described above with the metalized surface facing down towards the temperature sensor.

TABLE 1

|  | Metal layer orientation | Moisture vapor transmission rate g/m²/24 hrs | Temperature rise ° C. | |
| --- | --- | --- | --- | --- |
|  |  |  | $\Delta T_5$ | $\Delta T_{15}$ |
| Comparative Example 1 | N.A. | N.A. | 24.5 | N.D.** |
| Comparative Example 2 | N.A. | 2[a] | 32.6 | N.D. |
| Comparative Example 3 | UP | <1 | 4.0 | 9.0 |
| Comparative Example 4 | DOWN | <1 | 7.1 | 15.8 |
| Comparative Example 5 | N.A. | 1600 | 12.4[1] | 23.0[1] |
| Comparative Example 6 | UP | 1314 | 7.1[2] | 14.9[2] |
| Example 7 | DOWN | 1314 | 5.6[3] | 12.5[3] |

*N.A. not applicable.
**N.D. not determined because the test was stopped when the temperature reading exceeded 60° C.
[a]Measured on one layer
[1]Average of four pairs of measurements: 5 min values range from 12.2° C. to 12.5° C., 15 minute values range from 22.7° C. to 23.4° C.
[2]Average of six pairs of measurements: 5 min values range from 6.6° C. to 7.5° C., 15 minute values range from 14.0° C. to 15.5° C.
[3]Average of six pairs of measurements: 5 min values range from 5.3° C. to 6.2° C., 15 minute values range from 12.0° C. to 13.4° C.

Example 1 above shows the baseline rate of temperature increase in the test apparatus when the temperature sensors were exposed directly to the infra-red lamps. The results from Comparative Example 2 demonstrates that transparent stretch wrap commonly used to pack cargo for shipment, has very low moisture vapor permeability and dramatically increases the rate of temperature rise of the sensors relative to the baseline. Comparative Example 3 demonstrates the effectiveness of metalized bubble wrap, commonly installed with the metalized layer facing outer side to protect temperature sensitive cargo, i.e. with the metalized layer facing away from the cargo and towards any external heat source, but that this material is essentially a barrier to the passage of moisture vapor. Comparative Example 4 shows that reversing the orientation of the metal layer in a metalized bubble wrap, so that it faces downwards towards the sensor rather than upwards towards the infra-red lamps, reduces the effectiveness of the bubble wrap in reflecting incoming radiation, resulting in a higher rate of temperature increase. Comparative Example 5 shows that a reflective sheet composed of white polyethylene fibers having a high moisture vapor transmission rate is able to reduce the rate of temperature increase compared to transparent materials, but that this does not approach the level of protection of the metalized bubble wrap of Comparative Example 3. Example 7 demonstrates that the breathable, reflective sheet of this invention shows a higher degree of thermal protection when the metallic layer is facing downwards towards the sensor (or cargo), compared to the same porous reflective sheet having the metallic layer facing upwards towards the infra-red lamps (or external heat source) in Comparative Example 6. This result is unexpected in light of the data from the metalized bubble wrap which provided better thermal protection when the reflective metallic layer faced upwards towards the infra-red lamp (Comparative Examples 3 and 4).

Example 8

Tyvek® 1560M, a polyethylene non-woven reflective sheet bearing deposited on one side a thin layer of metallic aluminium, such that the sheet has an areal density of 58 g/m², a total light reflectivity on the white side of 92.2% and an emissivity on the metalized side of 0.15, available from E.I. DuPont de Nemours and Company. This material was tested by the method described above with the metalized surface facing downward towards the temperature sensor.

Example 9

Tyvek® 3566M, a polyethylene non-woven reflective sheet having deposited on one side successively a patterned, flame retardant coating, a thin layer of metallic aluminium and a thin corrosion resistant lacquer such that the sheet has an areal density of 64 g/m², a total light reflectivity on the white side of 92.6% and an emissivity on the metalized side of 0.11, commercially available from E.I. DuPont de Nemours and Company. This material was tested by the method described above with the metalized surface facing downwards towards the temperature sensor.

Example 10

A polyethylene non-woven reflective sheet having deposited on one side successively a thin layer of metallic aluminium, a thin corrosion resistant lacquer and a patterned, flame retardant coating such that the sheet has an areal density of 64 g/m², a total light reflectivity on the white side of 91.4% and an emissivity on the metalized side of 0.31. This material was tested by the method described above with the metalized surface facing downwards towards the temperature sensor.

TABLE 2

| | Moisture vapor transmission rate | Temperature rise ° C. | | ISO 3795 flame | Corrosion resistance |
|---|---|---|---|---|---|
| | g/m²/24 hrs | $\Delta T_5$ | $\Delta T_{15}$ | resistance | % |
| Example 7 | 1314 | 5.6 | 12.5 | FAIL | >90 |
| Example 8 | 1178 | 5.4 | 12.6 | FAIL | 50 |
| Example 9 | 976 | 5.4 | 12.2 | PASS | >90 |
| Example 10 | 614 | 6.3 | 13.7 | PASS | >90 |

Example 8 illustrates a simple embodiment of the invention, being a breathable reflective sheet bearing a low emissivity metal layer on one side, and demonstrates high moisture vapor permeability and low radiant heat transfer, but the metal layer is readily corroded by exposure to humidity and this reflective sheet is flammable and fails the ISO 3795 flame resistance test. This is in contrast to Example 7 which shows that a suitable protection layer can be applied on top of the metal layer to provide resistance to corrosion without significantly changing the moisture vapor permeability or radiant heat transfer of the reflective sheet. Examples 9 and 10 illustrate the use of a flame retardant coating in combination with a protective layer to achieve both corrosion resistance and flame retardancy in a breathable, reflective sheet. Example 10 demonstrates that thermal protection can be improved when a patterned flame retardant coating is applied on top of a metallic layer and protective layer and Example 9 demonstrates an even higher degree of thermal protection when the metallic layer and corrosion resistant coating are applied on top of the patterned flame retardant coating.

Comparative Example 11

A perforated, expanded, closed cell, polyethylene foam of 1.3 mm thickness and areal 24 g/m² density, having circular perforations 4 mm in diameter positioned at 40 mm intervals in rows spaced 90 mm apart was tested by the method described above, ensuring that no perforation was positioned above the temperature sensor well of the apparatus.

Comparative Example 12

The perforated, expanded, closed cell polyethylene foam of Comparative Example 11 was laminated on one side to a single layer of Tyvek® 1589B non-woven polyethylene sheet having an areal density of 81 g/m² to produce a laminate having a total areal density of 123 g/m² and a light reflectivity of 93.3% measured on the white side. The radiant heat transfer rate of the laminate was tested by the method described above with the white side facing the infra-red lamps.

Example 13

The perforated, expanded, closed cell polyethylene foam of Comparative Example 11 was laminated on one side to a single layer of Tyvek® 1589B non-woven polyethylene sheet having an areal density of 81 g/m² and on the other side to a single layer of the Tyvek® 3566M of Example 9 such that the white side of the Tyvek® 3566M was adjacent to the foam layer and the metalized side of the Tyvek 3566M formed an exterior surface of the laminate. The resulting flexible laminate had a total areal density of 203 g/m², a light reflectivity of 93.9% measured on the white side and an emissivity of 0.12 measured on the metalized side. The radiant heat transfer rate of the laminate was tested by the method described above with the white side facing the infra-red lamps and the metalized side facing the temperature sensor.

Example 14

A laminated reflective sheet was simulated by stacking a lower layer of the reflective sheet of Example 7 with the metalized side facing downwards, a middle layer of an open, three dimensional network of stiff polyethylene fibers having an areal density of 185 g/m² and a mean thickness of 8 mm as a spacer and an upper layer of the reflective sheet of Example 7 with the metalized side facing downwards towards the spacer. The stack of sheets was tested in the given orientation by the method described above.

Example 15

Standard physical vapor deposition techniques were used to deposit a layer of aluminium of approximately 175 mg/m² onto one side of a meta-aramid paper having an areal density 41 g/m² which is commercially available from E.I. DuPont de Nemours and Company as Nomex® 412. The resulting sheet had a total light reflectivity of 68.2% measured on the plain side and an emissivity of 0.09 measured on the metalized side. This metalized reflective sheet was found to be essentially non-inflammable in the ISO 3795 horizontal flame propagation test. A sample of this material was tested by the method described above with the metalized side facing down towards the temperature sensor.

Example 16

A laminated reflective sheet was simulated by stacking a lower layer of the reflective sheet of Example 7 with the metalized side facing downwards, a middle layer of a loose, three dimensional network of stiff polyethylene fibers having an areal density of 185 g/m² and a mean thickness of 8 mm as a spacer and an upper layer of the metalized meta-aramid sheet of Example 15 with the metalized surface facing down towards the spacer. The stack of sheets was tested in the given orientation by the method described above.

Example 17

A laminated reflective sheet was simulated by stacking a lower layer of the flame retardant reflective sheet of Example 9 with the metalized side facing downwards, a middle layer of an open, three dimensional network of stiff polyethylene fibers having an areal density of 185 g/m² and a mean thickness of 8 mm as a spacer and an upper layer of the flame retardant reflective sheet of Example 9 with the metalized side facing downwards towards the spacer. The stack of sheets was tested in the given orientation by the method described above.

Example 18

A laminated reflective sheet was simulated by stacking a lower layer of the metalized meta-aramid sheet of Example 15 with the metalized surface facing down, a middle layer of a loose, three dimensional network of stiff polyethylene fibers having an areal density of 185 g/m² and a mean thickness of 8 mm as a spacer and an upper layer of flame retardant reflective sheet of Example 9 with the metalized side facing downwards towards the spacer. The stack of sheets was tested in the given orientation by the method described above.

Example 19

A laminated reflective sheet was simulated by stacking a lower layer of the reflective sheet of Example 7 with the metalized side facing downwards, a middle layer of an extruded sheet of copolymer/paraffin wax blended phase change material having a thickness of 5 mm and a phase transition temperature of 22° C. available from E.I. DuPont de Nemours and Company as Energain® and used with the aluminium foil encapsulating layers removed, and an upper layer of the polyethylene non-woven sheet of Comparative Example 5. The stack of sheets was tested by the method described above with the metalized sheet facing downwards.

Example 20

A laminated reflective sheet was simulated by stacking a lower layer of the reflective sheet of Example 7 with the metalized side facing downwards, a middle layer of Cambrelle® Type 150 non-woven fabric incorporating superabsorbent fibers having an area density of 159 g/m² and a thickness of 0.9 mm available from Camtex Fabrics Ltd., which had previously been soaked in deionized water so as to take up approximately 2.1 kg/m² of water, and an upper layer of the polyethylene non-woven sheet of Comparative Example 5. The stack of sheets was tested in by the method described above with the metalized sheet facing downwards.

TABLE 3

| | Moisture vapor transmission rate | Temperature rise ° C. | |
| --- | --- | --- | --- |
| | g/m²/24 hrs | $\Delta T_5$ | $\Delta T_{15}$ |
| Comparative Example 11 | N.D. | 28.7 | N.D. |
| Comparative Example 12 | 379 | 9.1 | 18.0 |
| Example 13 | 31 | 4.2 | 10.9 |
| Example 14 | 657* | 2.2 | 6.4 |
| Example 15 | 61 | 6.7 | 15.1 |
| Example 16 | 58* | 3.2 | 8.7 |
| Example 17 | 488* | 2.6 | 7.1 |
| Example 18 | 57* | 2.5 | 7.2 |
| Example 19 | N.D.** | 1.0 | 4.9 |
| Example 20 | N.D.** | 1.5 | 5.5 |

*calculated value based on the individual moisture vapor transmission rates of the components of the simulated laminate
**the moisture vapor transmission rate for this simulated laminate was not determined or calculated but it is obvious that a degree of vapor permeability may be achieved in these structures if the spacer layer is perforated or otherwise applied in a pattern-wise fashion.

Comparative Examples 11 and 12 and Example 13 demonstrate that a thin layer of polyethylene foam gives very little thermal protection when exposed to infra-red radiation, a laminate of such a foam with a reflective white layer of Tyvek® on the outer side provides better thermal protection, and that a laminated reflective sheet of this invention, having the same polyethylene foam sandwiched between a highly reflective outer surface and a low emissivity metalized inner surface, offers a high degree of thermal protection while maintaining a light and flexible structure. The moisture vapor transmission rate demonstrated is modest but sufficient to prevent condensation inside the cargo in many circumstances, and may be adjusted by varying the size and number of perforations in the polyethylene foam spacer layer, or by using an open-cell foam layer, or both.

Example 14 illustrates the use of a spacer layer to separate two reflective sheets with their metalized surfaces each facing inwards to form a multi-layer reflective cover system of this invention which has very good radiant barrier properties and which retains a modest but adequate moisture vapor transmission rate. Adhesives could be used to bond the spacer layer to one or both of the breathable reflective sheets to form a composite reflective sheet.

Examples 15 to 18 illustrate various embodiments of a flame retardant composite reflective sheet or reflective cover system according to this invention which comprise fire blanket layers made from fire resistant materials, or flame retardant coated reflective sheets layers, with or without an insulating spacer layer. Examples 19 and 20 illustrate the use of a phase change material and/or heat sink material as spacer layer to form a composite reflective sheet according to this invention, having a very high degree of protection against radiant heat.

Example 21

To demonstrate by example the use of an ACL, comprising an internal PCM, as a layer to form a composite reflective sheet according to this invention the following experiment was conducted.

ACL elements were constructed from a copper foil case filled with E88 (alternatively E88C) Nomex® felt made by E.I. DuPont de Nemours & Company. Type E88/E88C spunlaced fabrics are designed for uses that require a high degree of saturability and which must satisfy severe thermal-, fire- or chemical-resistance requirements. These nonwoven sheets have an open and porous structure that allow for easy saturation by liquids. The internal coolant/PCM used in the ACL elements was pure water. Two ACL elements 39 cm long×2.4 cm wide×1 mm thick, were positioned vertically according to their longer axes in the same ceramic cylindrical container of 7 cm diameter, containing 320 g of water initially at 63° C. so that the submerged length of the ACL elements was 9 cm. As a control an identical ceramic cylinder containing 320 g of water initially at 63° C. was placed next to the cylinder containing the two ACL elements. Both cylinders were positioned on an 8 mm thick Teflon plaque to minimize any conductive cooling from the bases of the containers. The surrounding ambient temperature was 22° C., without external radiation. The temperature of the water in each cylinder was measured at time intervals after the initial filling with hot water. The results are listed in Table 4.

TABLE 4

| | Water temperature ° C. | | |
|---|---|---|---|
| | Initial | 5 minutes | 10 minutes |
| With ACL | 63 | 54.8 | 51.1 |
| Control | 63 | 56.6 | 52.9 |

A significant temperature reduction was observed in the case where two ACL elements were used, which represents an advantage to form a composite reflective breathable sheet according to this invention. Combined with a reflective breathable sheet of Example 9, additional thermal management benefits were observed.

Such ACL elements have three dimensional heat transfer characteristics and can be positioned in the most suitable configurations to maintain breathability and reflectivity of the composite assemblies of this invention, such as depicted in FIGS. 1 to 6. The casing can be made of materials comprising aluminium composites, copper, ceramic, fibrous blends and alloys thereof as well as any material with intrinsic thermal conductivity, suitable mechanical resistance and which can be machined or formed, and the combinations thereof.

Simulated Cargo Cover Tests

Cardboard boxes measuring 40.6 cm×31.8 cm×25.4 cm were used to simulate products to be protected by reflective breathable covers in different configurations. A battery powered temperature recorder was taped to the centre of the bottom of each box, and a 3 liter polyethylene bottle filled with water was taped to the inner wall of each box, ensuring that it did not touch the temperature recorder. The boxes were closed and wrapped in an identical fashion with a single layer of the cover material to be tested, using adhesive tape to secure the wrapping in place. For each cover material, one box was wrapped tightly so that the cover material was in contact with the box and a second identical box was wrapped with the cover material after being outfitted with 20 small, 1.9 cm thick, insulating foam spacers adhered to the top and adjacent sides of the box to maintain an air gap between the cover and the box. The boxes were first stored inside the laboratory overnight to ensure they all reached the same initial temperature and they were then taken outside and placed randomly on wooden pallets, four boxes to a pallet in a single layer, such that they were completely exposed to the sun away from any external shade as well as from the shade of adjacent boxes. The boxes were left exposed to the ambient conditions during a whole sunny day and a clear, cold night in Richmond, Va., USA on 18-19 Apr. 2010 (history reports available on http://weathersource.com/past-weather/weather-history-reports/). The boxes were then opened and the data from the temperature recorders was collected.

Comparative Example 22

Tyvek® 1560B of Comparative Example 5, available from E.I. DuPont de Nemours and Company, was used to wrap the boxes.

Comparative Example 23

Tyvek® 1560M of Example 8 was used to wrap the boxes with the metalized side on the outer side facing the external environment.

Example 24

Tyvek® 1560M of Example 8 was used to wrap the boxes with the metalized side on the inner side facing the boxes. Temperature data are listed in Table 5.

TABLE 5

|  | Comparative Example 22 | | Comparative Example 23 | | Example 24 | |
| --- | --- | --- | --- | --- | --- | --- |
|  | Without spacers | With spacers | Without spacers | With spacers | Without spacers | With spacers |
| Initial Temperature ° C. | 14.7 | 13.6 | 16.2 | 16.9 | 15.0 | 15.7 |
| Maximum Temperature ° C. | 31.9 | 31.4 | 36.3 | 34.8 | 30.7 | 29.7 |
| Temperature Range ° C. | 26.3 | 25.9 | 29.0 | 27.1 | 24.5 | 22.3 |
| Time for temperature to rise by 10° C. (minutes) | 222 | 224 | 200 | 204 | 250 | 300 |

These examples demonstrate that the maximum temperature and range of temperature variation of the simulated cargos are reduced when the breathable, reflective sheet is used to cover the cargo with the metallic layer on the inner side as compared with either the same sheet used with the metallic layer on the outer side or to a breathable reflective cover having no metallic layer. The results also show the additional benefit of a spacer layer between the cover and the cargo. In this experiment a breathable reflective sheet of this invention extended the time required for a 10° C. temperature rise by about 25 minutes with no spacer layer and by 75 minutes with a spacer layer, compared to a white cover.

To demonstrate the advantages of a cargo cover comprising the reflective sheet of this invention, identical simulated cargos protected by a cover according to this invention and alternate cover designs were temperature monitored while being simultaneously exposed to varying, outdoor weather conditions including exposure to direct sunlight and while being exposed to an ambient temperature significantly above that of the cargo. This replicated the kind of rapid and extreme fluctuations in ambient temperature which may be experienced during transport.

Four identical simulated cargos were constructed as follows according to BS EN 12546:2-2000: Materials and articles in contact with food products—Insulated containers for domestic use—Part 2: Specification for insulated bags and boxes. Six standard Euro-pallets of 800 mm width×1200 mm length were used as the base for four identical simulated cargo loads. Except where otherwise indicated below, the bottom of the cargo was closed to prevent air circulation from below by placing on the pallet a base sheet of Tyvek® 1560B having the same dimensions as the pallet before the simulated cargo was loaded onto that pallet. Commercially available 500 ml PET bottles of mineral water (55 mm diameter×220 mm height) were packed onto carton trays in a 6×4 array with eight of the bottles in each pack being replaced randomly by empty bottles so that the air to water volume ratio in each pack was 50:50. Adhesive tape was wrapped around the outside of the bottles in each pack to secure the bottles in place. Four layers of such packs of bottles were loaded onto each pallet, each layer consisting of nine packs of bottles arranged in three rows of three. In this way, six simulated cargos were created, each 1 m tall and consisting of 1296 mineral water bottles, of which ⅓ were empty to achieve an overall 50% air volume inside the cargo with 432 liters of water in the cargo to provide a standard total heat capacity. During the construction of each simulated cargo, four battery operated temperature recorders were built into the cargo, one at the bottom left front corner of the bottom layer of bottle packs, one in the center of the second layer of bottle packs, one at the top right back corner of the top layer of bottle packs and one on top of the cargo in the center of the top layer of bottle packs. The temperature recorders used were Thermobutton® type 22L manufactured by iButton which have a measuring range of +85° C. to −40° C. and a resolution of 0.1° C. and the sampling rate of the recorders was set to one data point every five minutes. Three of these identical, simulated cargos were then covered by cargo covers made from the various materials tested, and the fourth was covered only in stretch wrap film to stabilize the cargo in the following non-limiting examples.

Comparative Example 25

A bottom sheet of Tyvek® 1560B and a cover made from Tyvek® 15603, the white, breathable polyethylene nonwoven sheet of Example 5, available from E.I. DuPont de Nemours and Company. The cover material was formed into a cuboid shape 1.2 m high by 0.82 m deep by 1.22 m wide, closed along the vertical edges using double sided adhesive tape and with the bottom face open to allow it to be pulled easily over the simulated cargo on the pallet to completely but loosely cover the simulated cargo.

Example 26

A bottom sheet of Tyvek® 1560B and a cover made from Tyvek® 3563M, the breathable, metalized polyethylene non-woven reflective of Example 7, commercially available from E.I. DuPont de Nemours and Company. The cover material was formed into a cuboid shape as described for Comparative Example 25 and this was used to completely but loosely cover the simulated cargo with the metal layer of the cover on the inner side facing towards the simulated cargo.

Comparative Example 27

A bottom sheet of Tyvek® 1560B and a cover made from sheets of Isohood 2L-2 6 mm thick, double-side metalized bubble-wrap available from EcoCool GmbH. This was applied as a single layer with the metalized surface on the outer side facing outwards and was taped in place to completely but loosely cover the simulated cargo.

Comparative Example 28

The simulated cargo was wrapped with Resinex 581, the 23 micron polyethylene stretch wrap of Comparative Example 2, in a manner typically employed for the stabilization and protection of pallet loads for transport. In this case, consistent with common practice, no bottom sheet was used.

Voltcraft DL 120 TH/DL 100 T temperature recorders which have an operating range of −40° C. to +70° C. and a resolution of 0.1° C. were placed on the top of each simulated cargo on the outer side of the cover to record the ambient temperature every five minutes during subsequent tests.

The four simulated cargos were first conditioned for several days to a starting temperature of 20° C. in a temperature controlled building with no direct sun exposure.

Outdoor Exposure:

The simulated cargos were taken out of the temperature controlled building on their pallets and placed outdoors away from any sources of shade, spaced more than one pallet width apart in a line oriented east-west and with the temperature recorders on each pallet having the same orientation relative to due south. The simulated cargos were continuously exposed to ambient conditions in Luxembourg during two consecutive days and nights from 1 to 3 Aug. 2011 when the weather was dry and cloud cover was minimal.

50° C. Chamber:

At the end of the two day outdoor exposure the simulated cargos were removed as nearly simultaneously as possible into in a heated chamber with a controlled air temperature of +50° C. (+/−2° C.) and were stored there for 18 hours. Except when illuminated for loading and unloading, the interior of the heated chamber was dark during this time.

At the end of the temperature exposure cycles, the simulated cargos were allowed to cool back to room temperature, the covers were removed and the temperature recorders were recovered for data analysis. The results are summarized in Tables 6 and 7.

TABLE 6

| Outdoor Exposure | | Temperature outside cover | Comparative Example 25 | Example 26 | Comparative Example 27 | Comparative Example 28 |
|---|---|---|---|---|---|---|
| Maximum Temperature ° C. | | 41.0 | 28.0 | 26.0 | 26.5 | 45.0 |
| Average Temperature ° C. | | 25.9 | 21.8 | 22.3 | 21.8 | 25.6 |
| Minimum Temperature ° C. | | 16.5 | 16.0 | 17.5 | 18.0 | 15.0 |
| Deviation from initial temperature ° C. | RMS* | 6.8 | 1.6 | 1.3 | 1.2 | 5.7 |
| | High | +18.5 | +5.5 | +5.0 | +4.0 | +23.0 |
| | Low | −6.0 | −6.5 | −3.5 | −4.5 | −7.0 |
| | Range | 24.5 | 12 | 8.5 | 8.5 | 30 |

*RMS = Root Mean Square i.e. the square root of the sum of the squares of the temperature deviations from the starting temperature recorded at every five minute time interval during the test - a measure of the amplitude of the periodic deviations from the starting temperature through two day and night temperature cycles.

TABLE 7

| 50° C. Chamber | Comparative Example 25 | Example 26 | Comparative Example 27 | Comparative Example 28 |
|---|---|---|---|---|
| Initial Temperature ° C. | 22.1 | 22.4 | 22.3 | 25.9 |
| Time until first point in cargo reached 25° C. (min) | 10 | 80 | 10 | — |
| Time until average temperature of cargo reached 25° C. (min) | 130 | 280 | 145 | — |
| Time until first point in cargo reached 30° C. (min) | 110 | 335 | 100 | 10 |
| Maximum temperature reached in cargo at end of test ° C. | 42 | 36 | 43 | 47.5 |
| Average temperature reached in cargo at end of test ° C. | 33 | 29 | 33 | 42.3 |
| Time until average temperature of cargo increased 10° C. above initial temperature (min) | 750 | >860 | 735 | 270 |
| Time until maximum temperature of cargo increased 5° C. above initial temperature (min) | 60 | 200 | 55 | 30 |

These results demonstrate that a cargo cover comprising a breathable reflective sheet of this invention is effective at reducing the rate of temperature change when a cargo is placed in a hot environment, even when there is no direct exposure to sunlight.

The examples and values given above are for illustrative purposes only and should not be construed in a limiting manner. Different embodiments of the invention may be The results from Example 26 demonstrate that a cargo cover made from a breathable reflective sheet of this invention significantly reduces the range of variation of the cargo temperature when the external temperature changes and the cargo is subjected to alternating sun exposure and darkness. A comparable breathable sheet lacking the metallic layer, Comparative Example 25, is less effective. A metalized bubble wrap, Comparative Example 27, is effective in reducing temperature fluctuations but is not breathable and is more than ten times thicker and much less flexible than the reflective sheet of this invention and is, therefore, more difficult to apply to the cargo. A polyethylene stretch wrap, Comparative Example 28, such as is typically used to stabilize palletized cargos is not breathable and provides no thermal protection, in fact causing temperature fluctuations to exceed those in the ambient environment.

combined together to form a product (i.e. sheet or cover) that is adapted to the specific requirements of the product being covered (e.g. acceptable temperature range, respiration, gas production, heat production, sensitivity to humidity, etc.) and to the conditions expected during transport.

The invention claimed is:

1. A sheet for covering products, the sheet comprising (i) at least one layer made of a reflective moisture vapor permeable substrate having a light reflectivity of greater than 65%, the substrate further having an outer side and an inner side wherein the outer side is facing away from the product to be covered and (ii) at least one metal layer having an emissivity of less than 0.35 adjacent to the inner side of the vapor permeable substrate wherein the at least one metal layer is moisture vapor permeable and is facing towards the product to be covered, and wherein the sheet further comprises a sealed layer containing a coolant, an evaporation part and a condensation part.

2. The sheet of claim 1, wherein the condensation part of the sheet is in contact with the at least one metal layer of the sheet.

3. The sheet of claim 1, wherein the reflective moisture vapor permeable substrate is a nonwoven or woven fabric comprising one or more natural or synthetic fibers or filaments.

4. The sheet of claim 3, wherein the reflective moisture vapor permeable substrate is a nonwoven fabric of flash-spun filaments.

5. The sheet of claim 1 further comprising a protection layer deposited or coated on the metal layer on the side of the metal layer remote from the vapor permeable substrate.

6. The sheet of claim 1 comprising a flame retardant layer positioned between the inner side of the vapor permeable substrate of the sheet and the at least one metal layer.

7. The sheet of claim 1 further comprising an insulating spacer layer.

8. The sheet of claim 7, wherein the sheet further comprises an adhesive layer or an adhesive promotion layer applied on one side or on both sides of said insulating spacer layer.

9. The sheet of claim 7, wherein the insulating spacer layer of the sheet is a bubble wrap layer.

10. The sheet of claim 9, wherein the bubble wrap of the spacer layer is a metallized bubble wrap.

\* \* \* \* \*